United States Patent
Song et al.

(10) Patent No.: US 10,223,653 B1
(45) Date of Patent: Mar. 5, 2019

(54) ONBOARDING DASHBOARD AND METHODS AND SYSTEM THEREOF

(71) Applicant: Elance, Inc., Mountain View, CA (US)

(72) Inventors: Sunny SunMin Song, Los Altos, CA (US); Yuet Ping Poon, Cupertino, CA (US); Jonathan Paul Diller, Soquel, CA (US); Anthony M. Hahn, San Jose, CA (US)

(73) Assignee: Elance, Inc., Mountain View, CA (US)

( * ) Notice: Subject to any disclaimer, the term of this patent is extended or adjusted under 35 U.S.C. 154(b) by 990 days.

(21) Appl. No.: 14/628,095

(22) Filed: Feb. 20, 2015

Related U.S. Application Data

(60) Provisional application No. 61/942,558, filed on Feb. 20, 2014.

(51) Int. Cl.
*G06Q 10/00* (2012.01)
*G06Q 10/06* (2012.01)

(52) U.S. Cl.
CPC ............ *G06Q 10/063114* (2013.01); *G06Q 10/063118* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | |
|---|---|---|---|
| 6,092,049 A | 7/2000 | Chislenko et al. | |
| 6,208,659 B1 | 3/2001 | Govindarajan et al. | |
| 6,385,620 B1 | 5/2002 | Kurzius et al. | |
| 6,415,284 B1 * | 7/2002 | D'Souza | G06Q 10/10 |
| 6,591,011 B1 | 7/2003 | Nielsen | |
| 6,618,734 B1 * | 9/2003 | Williams | G06Q 10/06 |
| 6,662,194 B1 * | 12/2003 | Joao | G06Q 10/10 |
| | | | 705/1.1 |
| 6,735,570 B1 | 5/2004 | Lacy et al. | |
| 6,859,523 B1 * | 2/2005 | Jilk | G06Q 10/06 |
| | | | 379/265.01 |
| 6,871,181 B2 | 3/2005 | Kansal | |
| 6,931,385 B1 | 8/2005 | Halstead et al. | |
| 7,096,193 B1 | 8/2006 | Beaudoin et al. | |

(Continued)

OTHER PUBLICATIONS

D'Aurizio, Patricia. "Human Resource Solutions. Onboarding: Delivering the Promise." Nursing Economics 25.4 (2007): 228-229. (Year: 2007).*

(Continued)

*Primary Examiner* — Alan S Miller
(74) *Attorney, Agent, or Firm* — Haverstock & Owens LLP

(57) ABSTRACT

Embodiments of the present invention are directed to an onboarding dashboard and methods and system thereof for transitioning candidates into welcomed and engaged workers. In an online services exchange medium, clients find and hire freelancer candidates "on demand" to get projects done quickly and cost effectively. A client is able to use the onboarding dashboard to configure onboarding tasks for each individual or group of candidates the client hires. The candidates, once engaged with the client, are able use the onboarding dashboard to view the onboarding tasks established for them by the client. The onboarding dashboard provides complete visibility of the onboarding progress to both the client and the candidates, enforcement of step dependencies and management of documents.

21 Claims, 14 Drawing Sheets

(56) References Cited

U.S. PATENT DOCUMENTS

| | | | | |
|---|---|---|---|---|
| 7,346,535 | B2* | 3/2008 | Younger | G06Q 10/00 705/7.14 |
| 7,466,810 | B1 | 12/2008 | Quon et al. | |
| 7,505,919 | B2 | 3/2009 | Richardson | |
| 7,752,080 | B1 | 7/2010 | Greener | |
| 7,778,938 | B2* | 8/2010 | Stimac | G06Q 10/1053 705/321 |
| 7,814,085 | B1 | 10/2010 | Pfleger et al. | |
| 7,966,265 | B2* | 6/2011 | Schalk | G06Q 10/10 705/319 |
| 8,024,670 | B1* | 9/2011 | Rahmatian | G06Q 10/00 705/320 |
| 8,156,051 | B1* | 4/2012 | Shah | G06Q 10/10 705/1.1 |
| 8,224,755 | B2 | 7/2012 | Goodman et al. | |
| 8,380,709 | B1 | 2/2013 | Diller et al. | |
| 8,504,403 | B2* | 8/2013 | Deich | G06Q 10/06 705/7.12 |
| 8,512,143 | B2 | 8/2013 | Jung et al. | |
| 8,517,742 | B1* | 8/2013 | Johnson | G06Q 10/06 434/322 |
| 8,682,683 | B2* | 3/2014 | Ananian | G06Q 10/1053 705/1.1 |
| 8,700,694 | B2* | 4/2014 | Archbold | G06F 9/4881 705/7.11 |
| 8,788,590 | B2* | 7/2014 | Culver | G06F 17/5004 709/205 |
| 8,843,388 | B1* | 9/2014 | Westfall | G06Q 10/063112 705/7.13 |
| 8,856,670 | B1 | 10/2014 | Thakur et al. | |
| 9,020,271 | B2 | 4/2015 | Deolalikar et al. | |
| 9,454,576 | B1* | 9/2016 | Kapoor | G06F 17/30507 |
| 2001/0034630 | A1 | 10/2001 | Mayer et al. | |
| 2001/0034688 | A1 | 10/2001 | Annunziata | |
| 2001/0041988 | A1 | 11/2001 | Lin | |
| 2002/0007300 | A1* | 1/2002 | Slatter | G06Q 10/06311 705/7.13 |
| 2002/0010685 | A1 | 1/2002 | Ashby | |
| 2002/0052773 | A1* | 5/2002 | Kraemer | G06Q 10/063112 705/7.14 |
| 2002/0054138 | A1 | 5/2002 | Hennum | |
| 2002/0069031 | A1 | 6/2002 | Lehman | |
| 2002/0078432 | A1* | 6/2002 | Charisius | G06Q 10/06 717/102 |
| 2002/0103687 | A1* | 8/2002 | Kipling | G06Q 10/06 705/7.14 |
| 2002/0120554 | A1 | 8/2002 | Vega | |
| 2002/0161707 | A1 | 10/2002 | Cole et al. | |
| 2003/0004738 | A1* | 1/2003 | Chandar | G06Q 10/10 705/321 |
| 2003/0014294 | A1 | 1/2003 | Yoneyama et al. | |
| 2003/0050811 | A1* | 3/2003 | Freeman, Jr. | G06Q 10/063112 705/7.14 |
| 2003/0061266 | A1* | 3/2003 | Ouchi | G06Q 10/06 718/106 |
| 2003/0086608 | A1* | 5/2003 | Frost | G01N 15/147 382/173 |
| 2003/0097305 | A1 | 5/2003 | Ogino et al. | |
| 2003/0182171 | A1* | 9/2003 | Vianello | G06Q 10/063112 705/7.14 |
| 2003/0191684 | A1 | 10/2003 | Lumsden et al. | |
| 2003/0212246 | A1* | 11/2003 | Eleveld | B01J 27/26 528/409 |
| 2003/0212627 | A1 | 11/2003 | Burns et al. | |
| 2003/0220843 | A1 | 11/2003 | Lam et al. | |
| 2003/0233372 | A1* | 12/2003 | Warner | G06F 17/3089 |
| 2004/0064436 | A1 | 4/2004 | Breslin et al. | |
| 2004/0103167 | A1 | 5/2004 | Grooters et al. | |
| 2004/0128224 | A1 | 7/2004 | Dabney et al. | |
| 2004/0215560 | A1 | 10/2004 | Amalraj et al. | |
| 2004/0230466 | A1* | 11/2004 | Davis | G06Q 10/06 705/7.17 |
| 2004/0230511 | A1 | 11/2004 | Kannan et al. | |
| 2004/0230521 | A1* | 11/2004 | Broadbent | G06Q 40/02 705/38 |
| 2004/0241627 | A1* | 12/2004 | Delfing | G06Q 10/10 434/219 |
| 2004/0243428 | A1* | 12/2004 | Black | G06Q 10/10 705/320 |
| 2005/0033633 | A1* | 2/2005 | LaPasta | G06Q 10/10 434/362 |
| 2005/0043998 | A1 | 2/2005 | Bross et al. | |
| 2005/0097613 | A1* | 5/2005 | Ulate | H04N 5/2222 725/86 |
| 2005/0177380 | A1 | 8/2005 | Pritchard et al. | |
| 2005/0222907 | A1 | 10/2005 | Pupo | |
| 2006/0017975 | A1* | 1/2006 | Ly | G06F 3/1204 358/1.18 |
| 2006/0031177 | A1 | 2/2006 | Rule | |
| 2006/0080116 | A1* | 4/2006 | Maguire | G06Q 10/06 705/1.1 |
| 2006/0106846 | A1* | 5/2006 | Schulz | G06Q 10/10 |
| 2006/0143228 | A1* | 6/2006 | Odio-Paez | G06Q 10/107 |
| 2006/0177041 | A1 | 8/2006 | Warner et al. | |
| 2006/0195428 | A1 | 8/2006 | Peckover | |
| 2006/0212359 | A1 | 9/2006 | Hudgeon | |
| 2006/0284838 | A1* | 12/2006 | Tsatalos | G06Q 10/0637 345/156 |
| 2007/0022040 | A1 | 1/2007 | Gordon | |
| 2007/0061144 | A1 | 3/2007 | Grichnik et al. | |
| 2007/0088601 | A1* | 4/2007 | Money | G06Q 10/1053 705/321 |
| 2007/0112671 | A1 | 5/2007 | Rowan | |
| 2007/0130059 | A1 | 6/2007 | Lee et al. | |
| 2007/0174180 | A1 | 7/2007 | Shin | |
| 2007/0185723 | A1* | 8/2007 | Shellnutt | G06Q 10/1053 705/321 |
| 2007/0192130 | A1 | 8/2007 | Sandhu | |
| 2007/0233510 | A1* | 10/2007 | Howes | G06Q 30/0601 705/26.1 |
| 2008/0046834 | A1* | 2/2008 | Yu | G06Q 10/06316 715/771 |
| 2008/0059267 | A1* | 3/2008 | Hamilton | G06Q 10/00 705/7.15 |
| 2008/0059523 | A1 | 3/2008 | Schmidt et al. | |
| 2008/0091774 | A1 | 4/2008 | Taylor et al. | |
| 2008/0134292 | A1 | 6/2008 | Ariel et al. | |
| 2008/0154783 | A1 | 6/2008 | Rule et al. | |
| 2008/0194228 | A1 | 8/2008 | Pousti et al. | |
| 2008/0209417 | A1* | 8/2008 | Jakobson | G06F 9/4856 718/100 |
| 2008/0244582 | A1* | 10/2008 | Brown | G06F 9/54 718/100 |
| 2008/0288582 | A1 | 11/2008 | Pousti et al. | |
| 2008/0294505 | A1* | 11/2008 | Markowitz | G06Q 10/06312 705/7.22 |
| 2008/0294688 | A1* | 11/2008 | Brousard | G06Q 10/00 |
| 2008/0313005 | A1 | 12/2008 | Nessland et al. | |
| 2009/0011395 | A1 | 1/2009 | Schmidt et al. | |
| 2009/0055404 | A1 | 2/2009 | Heiden et al. | |
| 2009/0055476 | A1 | 2/2009 | Marcus et al. | |
| 2009/0132345 | A1 | 5/2009 | Meyssami et al. | |
| 2009/0150386 | A1 | 6/2009 | Lichtblau | |
| 2009/0210282 | A1 | 8/2009 | Elenbaas et al. | |
| 2009/0241035 | A1 | 9/2009 | Tseng et al. | |
| 2009/0249340 | A1* | 10/2009 | Akiyama | G06Q 10/10 718/100 |
| 2009/0288021 | A1 | 11/2009 | Ioffe et al. | |
| 2010/0017253 | A1 | 1/2010 | Butler et al. | |
| 2010/0144318 | A1 | 6/2010 | Cable | |
| 2010/0161503 | A1* | 6/2010 | Foster | G06Q 10/10 705/321 |
| 2010/0162167 | A1 | 6/2010 | Stallings et al. | |
| 2010/0250322 | A1* | 9/2010 | Norwood | G06Q 10/06 705/7.21 |
| 2010/0287525 | A1 | 11/2010 | Wagner | |
| 2010/0324948 | A1* | 12/2010 | Kumar | G06Q 10/06 705/7.13 |
| 2011/0106762 | A1 | 5/2011 | Dane et al. | |

(56) References Cited

U.S. PATENT DOCUMENTS

| | | | |
|---|---|---|---|
| 2011/0131146 A1* | 6/2011 | Skutnik | G06Q 10/06 705/321 |
| 2011/0208665 A1* | 8/2011 | Hirsch | G06Q 10/1053 705/321 |
| 2011/0302053 A1 | 12/2011 | Rigole | |
| 2012/0041832 A1* | 2/2012 | Sheth | G06Q 30/06 705/26.2 |
| 2012/0110087 A1* | 5/2012 | Culver | G06F 17/5004 709/205 |
| 2012/0143952 A1* | 6/2012 | von Graf | G06Q 10/10 709/204 |
| 2012/0150761 A1* | 6/2012 | Ananian | G06Q 10/1053 705/321 |
| 2013/0246294 A1* | 9/2013 | Pendyala | G06Q 10/1053 705/321 |
| 2013/0325734 A1 | 12/2013 | Bixler et al. | |
| 2014/0074738 A1 | 3/2014 | Thankappan et al. | |
| 2014/0108078 A1* | 4/2014 | Davis | G06Q 10/063112 705/7.14 |
| 2014/0164271 A1* | 6/2014 | Forman | G06Q 10/1053 705/321 |
| 2014/0222493 A1* | 8/2014 | Mohan | G06Q 10/06316 705/7.26 |
| 2014/0358646 A1* | 12/2014 | Said | G06Q 10/06398 705/7.42 |
| 2014/0377723 A1* | 12/2014 | Strong | G09B 19/0053 434/118 |
| 2015/0032654 A1* | 1/2015 | Huff | G06Q 10/105 705/320 |
| 2015/0134600 A1* | 5/2015 | Eisner | G06F 17/30011 707/608 |
| 2016/0012135 A1 | 1/2016 | Wang et al. | |

OTHER PUBLICATIONS

Graybill, Jolie O., et al. "Employee onboarding: Identification of best practices in ACRL libraries." Library Management 34.3 (2013): 200-218. (Year: 2013).*

Muhl, Charles J. "What Is an Employee—The Answer Depends on the Federal Law." Monthly Lab. Rev. 125(2002): 9 pages.

Barton, Lisa Horwedel "Reconciling the independent contractor versus employee dilemma: a discussion of current developments as they relate to employee benefit plans." Cap. UL Rev 29 (2001): 63 pages.

Moran, Jenna Amato "Independent Contractor or Employee-Misclassification of Workers and Its Effect of the State." Buff. Pub. Int. LJ 28 (2009): 28 pages.

Webb, Teresa J., et al. "An empirical assist in resolving the classification dilemma of workers as either employees or independent contractors." Journal of Applied Business Research (JABR) 24. (2011): 22 pages.

Wood, Robert W. "Defining Employees and Independent Contractors." Bus. L. Today 17 (2007): 6 pages.

Paolucci et al., "Semantic Matching of Web Services Capabilities", 2002, Carnegie Mellon University, Pittsburgh, PA, USA.

* cited by examiner

ONBOARDING DASHBOARD AND METHODS AND SYSTEM THEREOF

RELATED APPLICATIONS

This application claims benefit of priority under 35 U.S.C. section 119(e) of the U.S. Provisional Patent Application Ser. No. 61/942,558 filed Feb. 20, 2014, entitled "Onboarding Dashboard," which is hereby incorporated by reference in its entirety.

FIELD OF INVENTION

The present invention relates to worker onboarding. More particularly, the present invention relates to an onboarding dashboard and methods and system thereof.

BACKGROUND OF THE INVENTION

Onboarding incoming employees is an opportunity for an employer to engage with the employees before the employees take on actives roles in the organization. As onboarding is a multifaceted operation, there are inevitable delays, complexities, inconsistencies, inefficiencies and a lack of visibility along the way, particularly in an online marketplace setting where professionals (e.g., freelancers) and buyers of services engage in the development and delivery of remote services and where chances are high that the professionals and buyers of services will never get to meet face to face. Onboarding freelancers currently involves many inefficient and manual steps. In addition, there are a lack of guidance and unnecessary delays in understanding of what needs to be completed, in communication and in capturing of completed artifacts, which can be numerous. Yet, proper onboarding is critical in a successful engagement kickoff, ensuring that these professional are aware of what is expected of them.

BRIEF SUMMARY OF THE INVENTION

Embodiments of the present invention are directed to an onboarding dashboard and methods and system thereof for transitioning candidates into welcomed and engaged workers. In an online services exchange medium, clients find and hire freelancer candidates "on demand" to get projects done quickly and cost effectively. A client is able to use the onboarding dashboard to configure onboarding tasks for each individual or group of candidates the client hires. The candidates, once engaged with the client, are able use the onboarding dashboard to view the onboarding tasks established for them by the client. The onboarding dashboard provides complete visibility of the onboarding progress to both the client and the candidates, enforcement of step dependencies and management of documents.

In one aspect, a system implementing an onboarding dashboard is provided. The system comprises a data store storing information relating to a job group, wherein the information includes configuration data for each task in the job group and progress data for each task in the job group, wherein the progress data pertains to a service provider. The system also comprises a computer server at a services exchange medium and communicatively coupled with the data store. The computer server is typically programmed to: receive from a computing device used by a client the configuration data for each task in the job group, provide a platform for the client to engage with the service provider and to assign the service provider to the job group, retrieve the information from the data store to automatically generate and transmit for rendering the onboarding dashboard relating to the job group on a web page, wherein the onboarding dashboard displays each task, visually identifies a status of the each task based on at least the progress data of the service provider and enforces task dependencies based on at least the configuration data, such that a second task cannot be started unless a first task is completed, and update a history of events for each task based on activities received from the onboarding dashboard, wherein the progress data includes the history of events.

In some embodiments, the status is one of completed, started but not yet completed, not yet started, flagged, and past due.

In some embodiments, the configuration data for the each task indicates that a specified user activity must be performed in order for the status to be changed to completed. For example, the specified user activity is uploading a document. For another example, the specified user activity is viewing a video.

In some embodiments, the configuration data for the each task indicates an 'owner' of each task. For example, the owner is the client. For another example, the owner is the service provider. The owner of a task is the person responsible for completing the task.

In some embodiments, the configuration data for each task indicates that the completion of the each task is required or is optional.

In some embodiments, the configuration data for each task indicates whether that task is dependent on another task or is independent from other tasks.

In some embodiments, the computer server is programmed to receive a signal activating one of the tasks displayed in the onboarding dashboard. In some embodiments, the computer server is programmed, in response to the signal, to automatically generate and transmit a window displaying the history of events pertaining to the activated task. In some embodiments, the computing server is programmed, in response to the signal, to prevent the start of the activated task when one or more tasks that the activated task depends on are not yet completed.

In another aspect, a method of implementing an onboarding dashboard is provided. The method includes storing information relating to a job group in a data store, wherein the information includes configuration data for each task in the job group and progress data for each task in the job group, wherein the progress data pertains to a service provider, receiving by a computing server from a computing device used by a client the configuration data for each task in the job group, providing by the computer server a platform for the client to engage with the service provider and to assign the service provider to the job group, retrieving by the computer server the information from the data store to automatically generate and transmit for rendering the onboarding dashboard relating to the job group on a web page, wherein the onboarding dashboard displays each task, visually identifies a status of each task based on at least the progress data of the service provider and enforces task dependencies based on at least the configuration data, such that a second task cannot be started unless a first task is completed, and updating by the computer server a history of events for each task based on activities received from the onboarding dashboard, wherein the progress data includes the history of events.

In some embodiments, the configuration data includes a schedule of future tasks to be completed and a schedule of reoccurring tasks to be completed, wherein the schedules are configured by the client.

In yet another aspect, a method of implementing an onboarding dashboard in a services exchange medium is provided. Typically, the services exchange medium includes a computing server and a data store in communication with the computing server. The method includes receiving by the computing server from a first computing device that is remote from the services exchange medium a configurable onboarding process flow for each job group administered by a user of the first computing device, storing in the data store the onboarding process flow for each job group, automatically retrieving from the data store by the computing server one of the onboarding process flows appropriate for a service provider, wherein the retrieval is according to the job group the service provider is associated with, and presenting on a second computing device that is remote from the services exchange medium the retrieved onboarding process flow.

In some embodiments, the retrieved onboarding process includes steps and rules. In some embodiments, one of the rules indicates that one of the steps can be completed in parallel with other steps in the retrieved onboarding process flow. In some embodiments, one of the rules indicates that one of the steps can only be started after other steps in the retrieved onboarding process flow are completed. In some embodiments, the rules enforce step dependencies.

In some embodiments, the retrieved onboarding process flow is rendered in the onboarding dashboard, wherein the onboarding dashboard visually identifies a status of each step and is a single access point for retrieving all contents associated with the retrieved onboarding process flow.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

An exemplary worker life cycle includes a recruitment stage, an onboarding stage, a mid-engagement stage and an offboarding stage. Onboarding is a key stage of the worker life cycle as new workers are oriented to their specific job functions and associated work expectations. A well established onboarding process will successfully integrate new hires into the workforce.

Embodiments of the present invention are directed to an onboarding dashboard and methods and system thereof for transitioning candidates into welcomed and engaged workers. In an online services exchange medium, clients find and hire freelancer candidates "on demand" to get projects done quickly and cost effectively. A client is able to use the onboarding dashboard to configure onboarding tasks for each individual or group of candidates the client hires. The candidates, once engaged with the client, are able use the onboarding dashboard to view the onboarding tasks established for them by the client. The onboarding dashboard provides complete visibility of the onboarding progress to both the client and the candidates, enforcement of step dependencies and management of documents.

Figure 1:
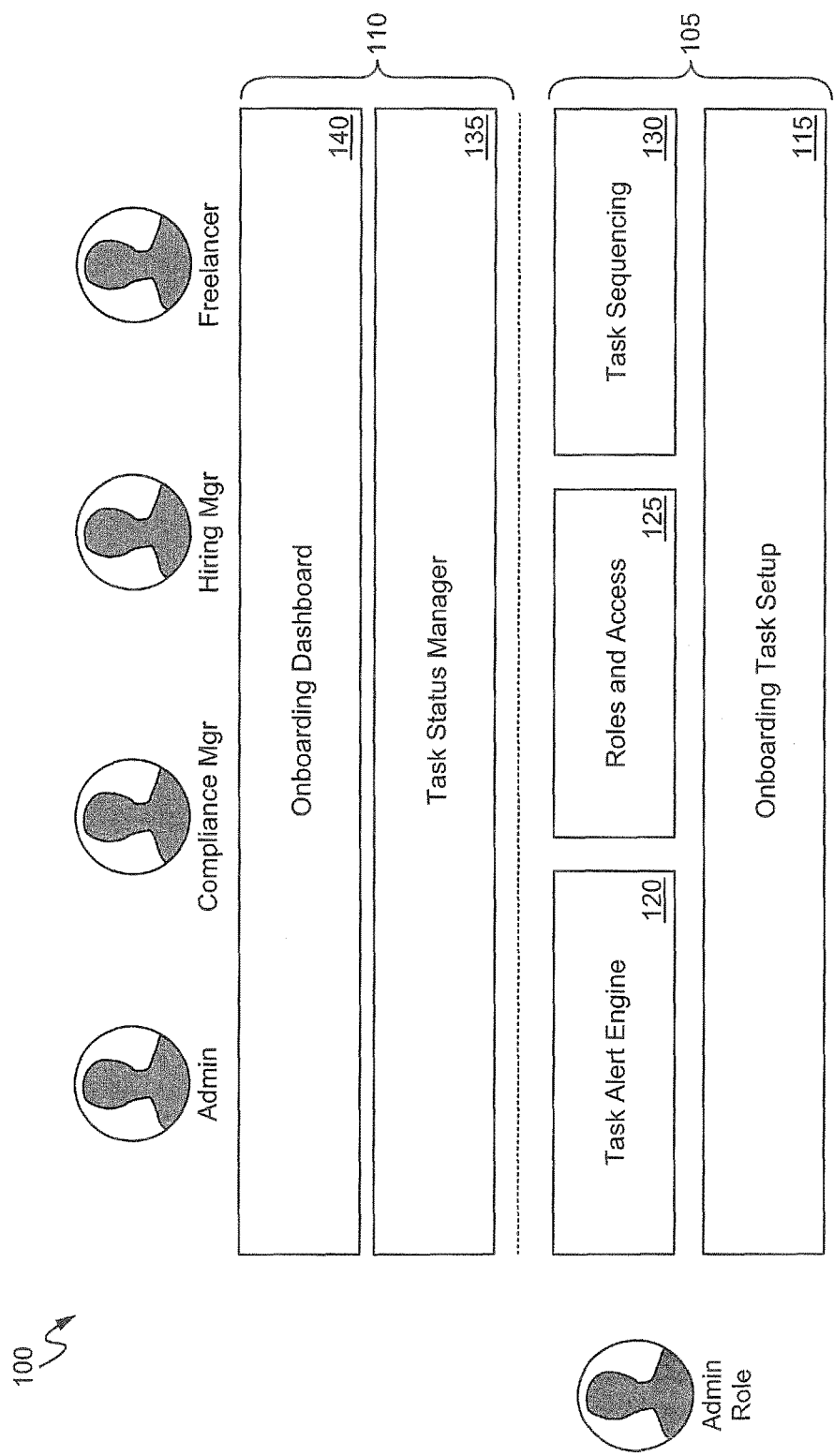
FIG. 1 illustrates a diagram of components of an onboarding dashboard engine in accordance with some embodiments.

FIG. 1 illustrates a diagram of components of an onboarding dashboard framework 100 in accordance with some embodiments. From a high level perspective, the components include back-end system components 105 and front-end system components 110. The back-end system components 105 include an onboarding task setup component 115, with a task alert engine 120, a roles and access component 125 and a task sequencing component 130 coupled with the onboarding task setup component 115 and/or to each other. The front-end system components 110 include a task status manager 135 coupled with an onboarding dashboard 140. The onboarding dashboard 140 includes at least two views: one view is a client view and another view is a freelancer view. The onboarding dashboard 140 can include other views, such as a administrator view. Each component is in communication with one, some or all of the other components of the onboarding dashboard framework 100. In some embodiments, the onboarding dashboard framework 100 includes one or more user interfaces to one or more of the components of the onboarding dashboard framework 100. The user interfaces are rendered in a web browser or, alternatively, the user interfaces are rendered in a standalone application that is in communication with the services exchange medium.

In some embodiments, an administrator can access both the back-end system components 105 and the front-end system components 110. In some embodiments, a compliance manager, a hiring manager and a freelancer can access only the front-end system components 110. The compliance manager and the hiring manager are collectively referred to as a customer or client. The customer is typically a buyer of services within the services exchange medium. In some embodiments, the customer is an enterprise scale organization that hires freelancers through the services exchange medium. Alternatively, the customer is an individual person that hires freelancers through the services exchange medium. It should be noted that the terms "customer," "client," "buyer of services" and simply "buyer" are used interchangeably herein. It should also be noted that the terms "freelancer," "service provider" and simply "provider" are used interchangeably herein. In some embodiments, the administrator can be a third party administrator who is hired by the client or by the freelancer or, alternatively, can be the client.

Within the services exchange medium, a freelancer is able to create an online profile and search through job posts, and a client is able to create and post jobs and search for freelancers. The services exchange medium provides an online platform with tools to facilitate matching clients with freelancers, to facilitate communication between clients and freelancers and to facilitate the completion of deliverables. An exemplary services exchange medium is discussed in the co-pending U.S. patent application Ser. No. 11/450,875, entitled "Virtual Office Environment," filed on Jun. 12, 2006, which is hereby incorporated by reference in its entirety. In some embodiments, a customer is able to hire a plurality of freelancers for a job in the services exchange medium. In some embodiments, a freelancer is able to work for more than one customer in the services exchange medium. In some embodiments, the services exchange medium provides clients and freelancers who are engaged with the clients with access to the onboarding dashboard. The aspects of each of the components of the onboarding dashboard framework 100 in FIG. 1 will become apparent as the configuration and accessing of the onboarding dashboard are further described below.

Additional details and aspects of a services exchange medium are described in the co-pending U.S. patent application Ser. No. 14/520,226, entitled "A Machine Learning Based System and Method of Calculating a Match Score and Mapping the Match Score to a Level," filed on Oct. 21, 2014, which is hereby incorporated by reference in its entirety. The aspects of the service exchange medium described in U.S. patent application Ser. No. 14/520,226 may be used to implement some or portions thereof of the various components shown in the figures. For example, Apache Tomcat and JAR RabbitMQ may be used to listen and pass events between the various components shown in FIGS. 11 and 12 (such as, e.g., user inputs triggering actions that make calls to remote procedures that pass events to the RabbitMQ) and an ODS and/or JAR may be used to store historical data about the performance and completion of tasks.

Figure 2:
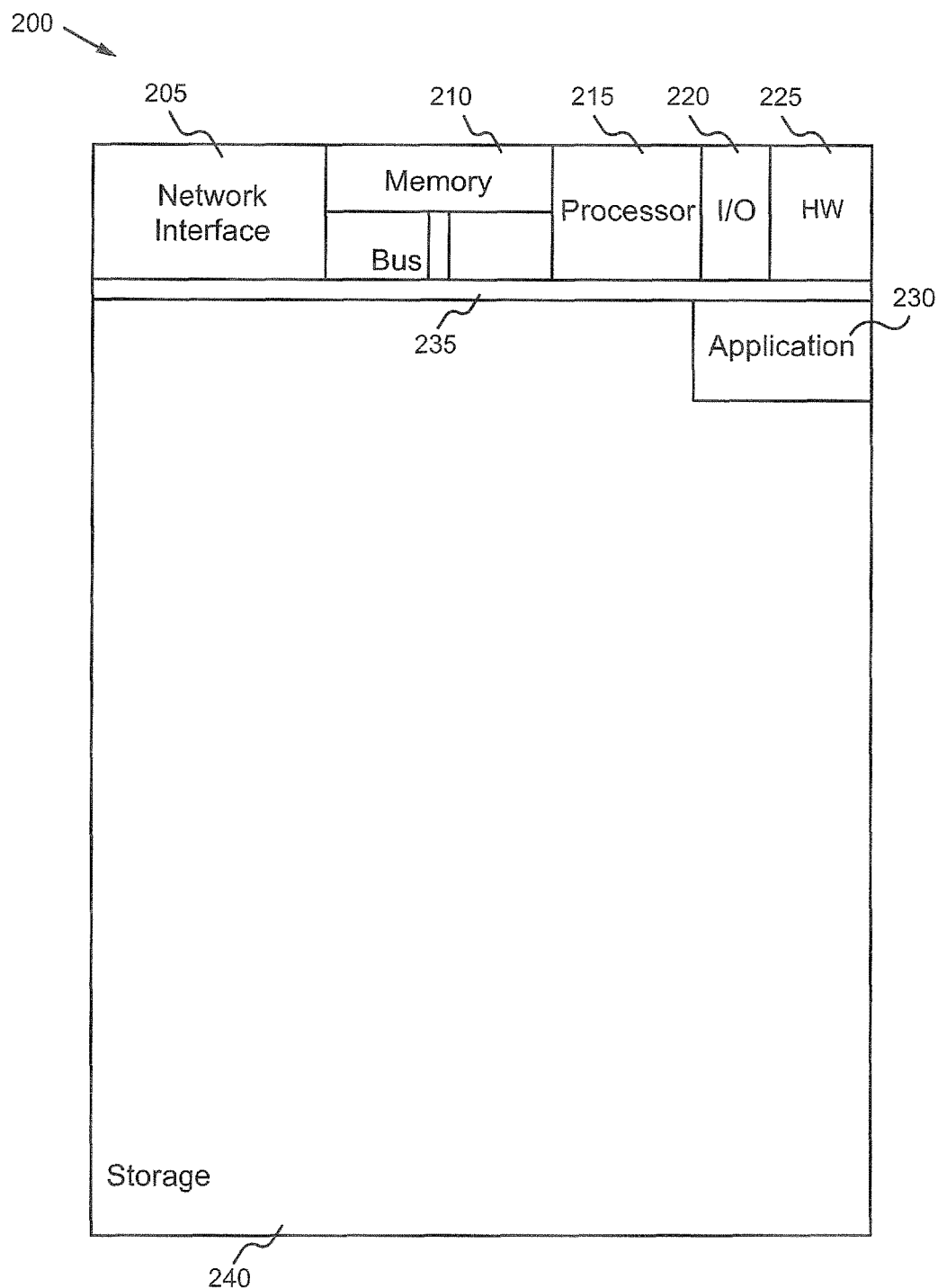
FIG. 2 illustrates a graphical representation of an exemplary computing device in accordance with some embodiments.

FIG. 2 illustrates a graphical representation of an exemplary computing device 200 in accordance with some embodiments. The computing device 200 is able to serve, compute, communicate, generate and/or display information. In some embodiments, the onboarding dashboard framework is implemented one or more of the computing device 200.

In general, a hardware structure suitable for implementing the computing device 200 includes a network interface 205, a memory 210, processor 215, I/O device(s) 220, a bus 235 and a storage device 240. The choice of processor is not critical as long as the processor 215 has sufficient speed. The memory 210 is any conventional computer memory known in the art. The storage device 240 is a hard drive, CDROM, CDRW, DVD, DVDRW, flash memory card or any other storage device. The computing device is able to include one or more network interfaces 205. An example of a network interface includes a network card connected to an Ethernet or other type of LAN. The I/O device(s) 220 are able to include one or more of the following: keyboard, mouse, monitor, display, printer, modem and other devices. Software applications 230 are likely to be stored in the storage device 240 and memory 210 and are executed by the processor 215. Software applications 230 include an application configured to implement the onboarding dashboard framework. More or less components shown in FIG. 2 are able to be included in the computing device 200. In some embodiments, hardware 225 for implementing the onboarding dashboard framework is included. Although the computing device 200 in FIG. 2 includes applications 230 and hardware 225 for implementing the onboarding dashboard framework, the onboarding dashboard framework can be implemented on a computing device in hardware, firmware, software or any combination thereof.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

Figure 3A:
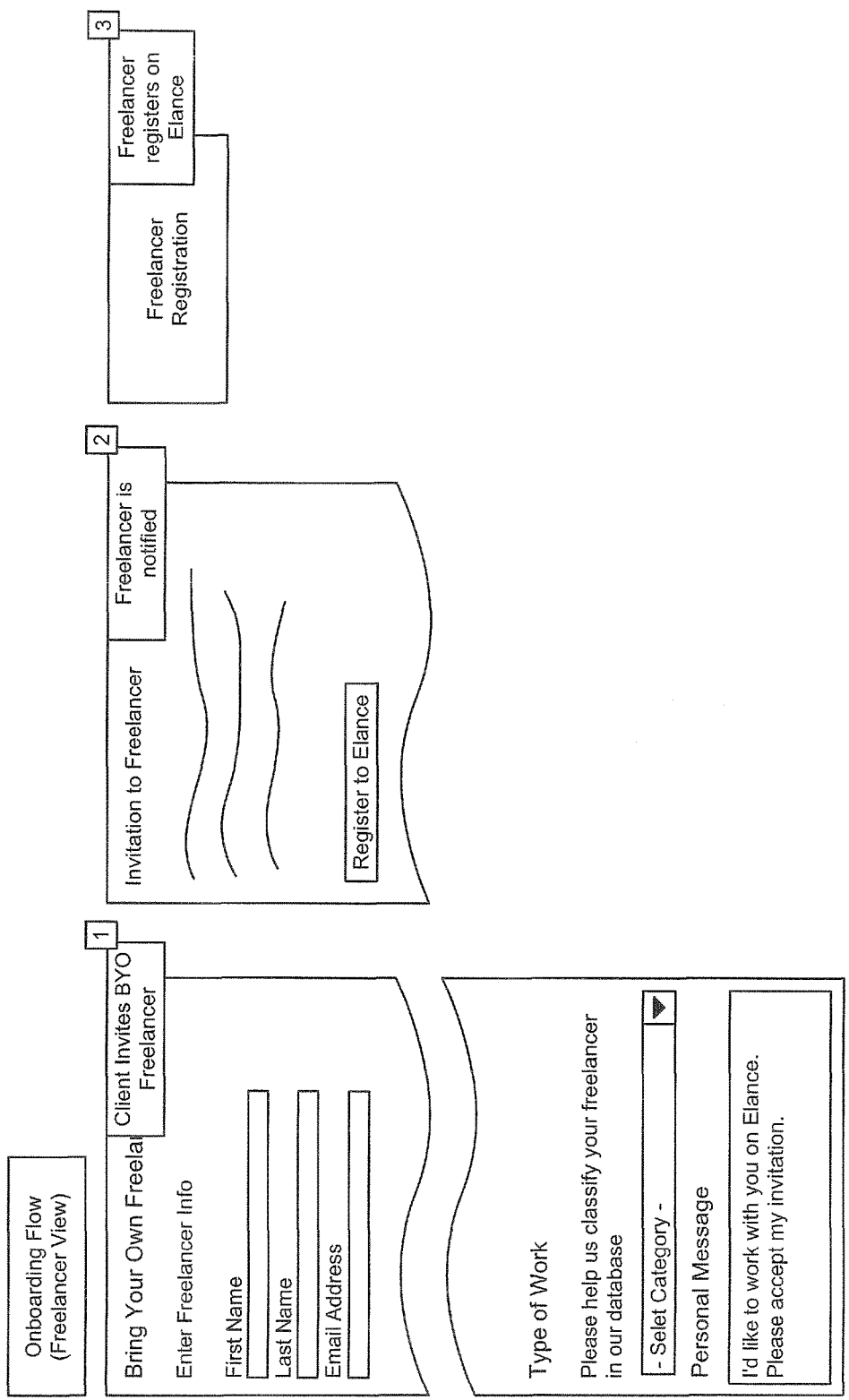
FIGS. 3A-3C illustrate a graphical flow of an onboarding process from a freelancer perspective in accordance with some embodiments.
Figure 3B:
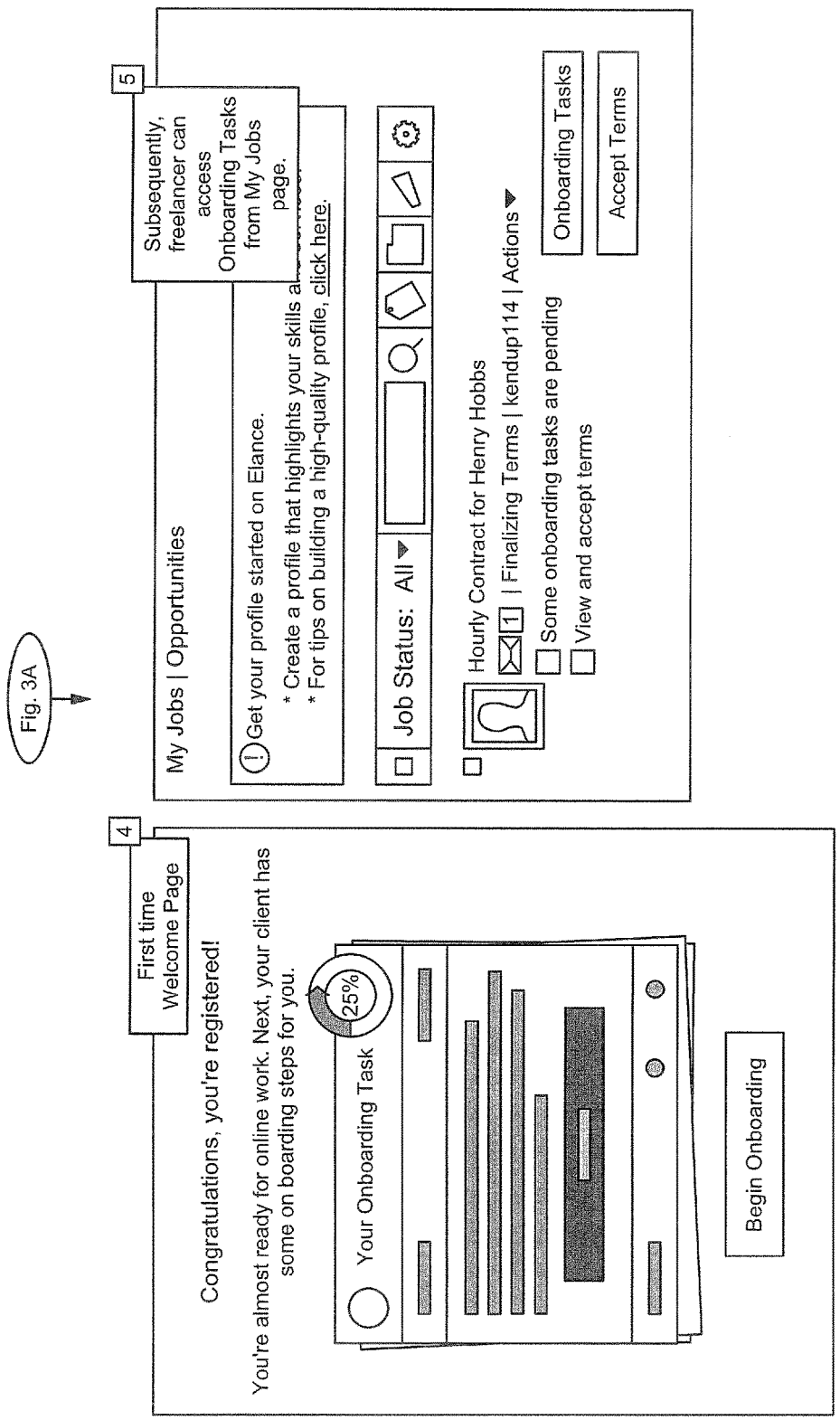
Figure 3C:
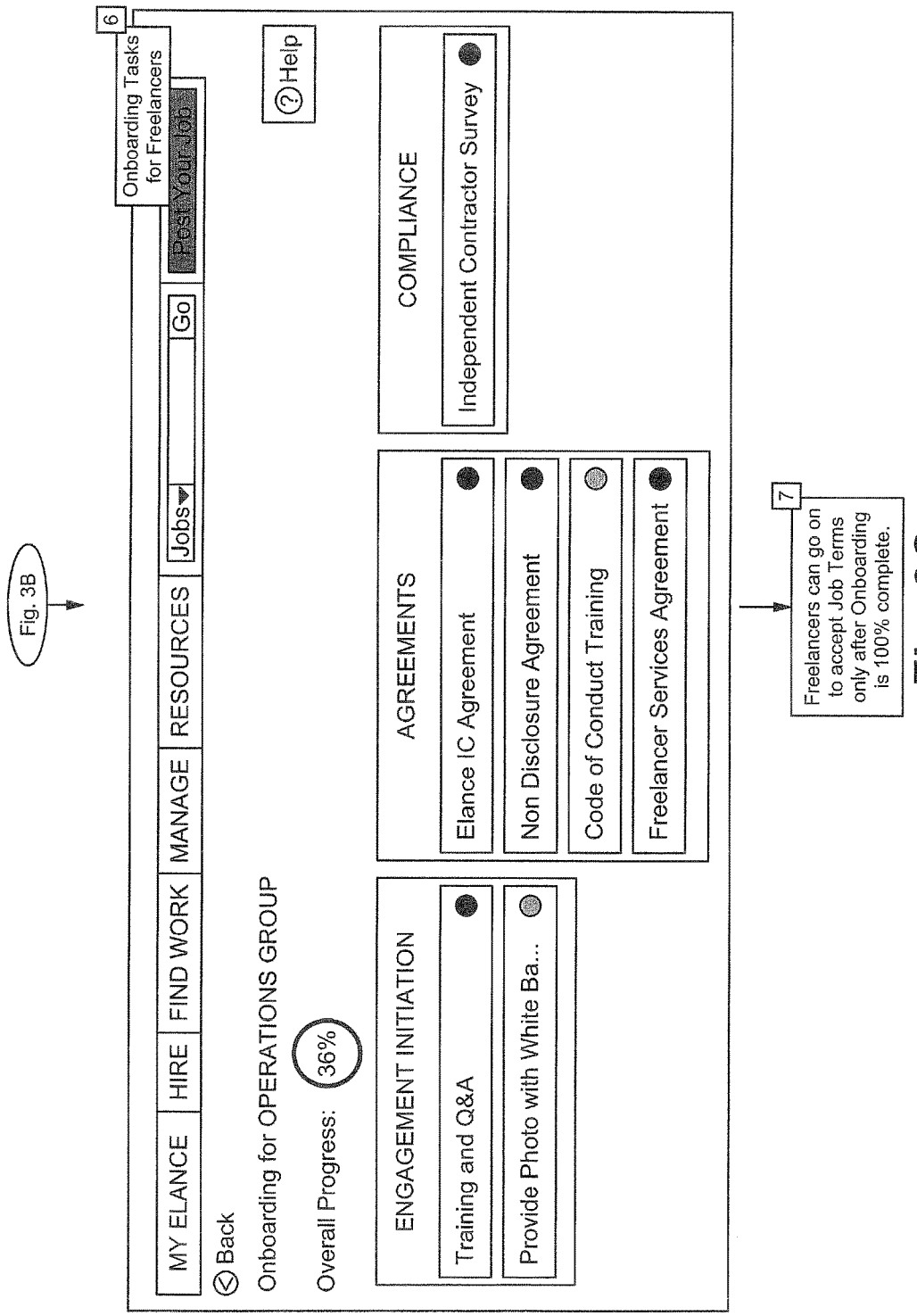

FIGS. 3A-3C illustrate a graphical flow 300 of an onboarding process from a freelancer perspective in accordance with some embodiments. The graphical flow 300 includes an exemplary screenshot at each step of the onboarding process. The graphical flow 300 begins on FIG. 3A and continues on FIGS. 3B-3C. Assume a client has found a potential freelancer candidate to hire for a job. At Step 1, the client invites the freelancer to join the services exchange medium. The client is already a member of the services exchange medium but the freelancer is not yet a member of the services exchange medium. In some embodiments, the invitation indicates which group the freelancer will be associated with. Groups are discussed in detail elsewhere. At Step 2, the freelancer is notified of the invitation via, such as email, text message or another suitable medium. At Step 3, the freelancer registers as a member of the services exchange medium by accessing, for example, a registration user interface to become a member of the services exchange medium. Upon registration with the services exchange medium, at Step 4, the freelancer is presented with a welcome user interface, which informs the freelancer that the freelancer has to complete onboarding steps that are required by the client. In some embodiments, if the freelancer is already a member of the services exchange medium, the Steps 1-4 are skipped (e.g., not performed). At Step 5, the freelancer is presented with a jobs user interface, which provides a link to create an online profile if one is not yet created, and a list of all jobs that the freelancer is associated with in the services exchange medium. The online profile can be viewed by all members of the services exchange medium. An exemplary online profile is discussed in the co-pending U.S. patent application Ser. No. 12/474,127, entitled "Online Professional Services Storefront," filed on May 28, 2009, which is hereby incorporated by reference in its entirety. Each job in the list includes a link to a personal and customized onboarding dashboard for a group the freelancer is associated with for the job, and a link to accept job terms. In FIG. 3B, only one job is shown for the freelancer in the screenshot for the Step 5. The onboarding tasks are typically configured by the client for the group and are reflected in the onboarding dashboard. Specifics of the client configuring the onboarding tasks are further discussed in FIG. 6. At Step 6, the freelancer is presented with the onboarding dashboard either from the jobs user interface upon activating the onboarding dashboard link or from the welcome interface upon activating the begin onboarding link. Specifics of the freelancer's view of the onboarding dashboard are further discussed in FIGS. 4A and 4B. At Step 7, the freelancer is able to accept the job terms (e.g., from the jobs user interface) only after at least a portion of the onboarding tasks is completed. In some embodiments, only those onboarding tasks that are required by the client need to be completed before the freelancer is able to accept the job terms.

Figure 4A:
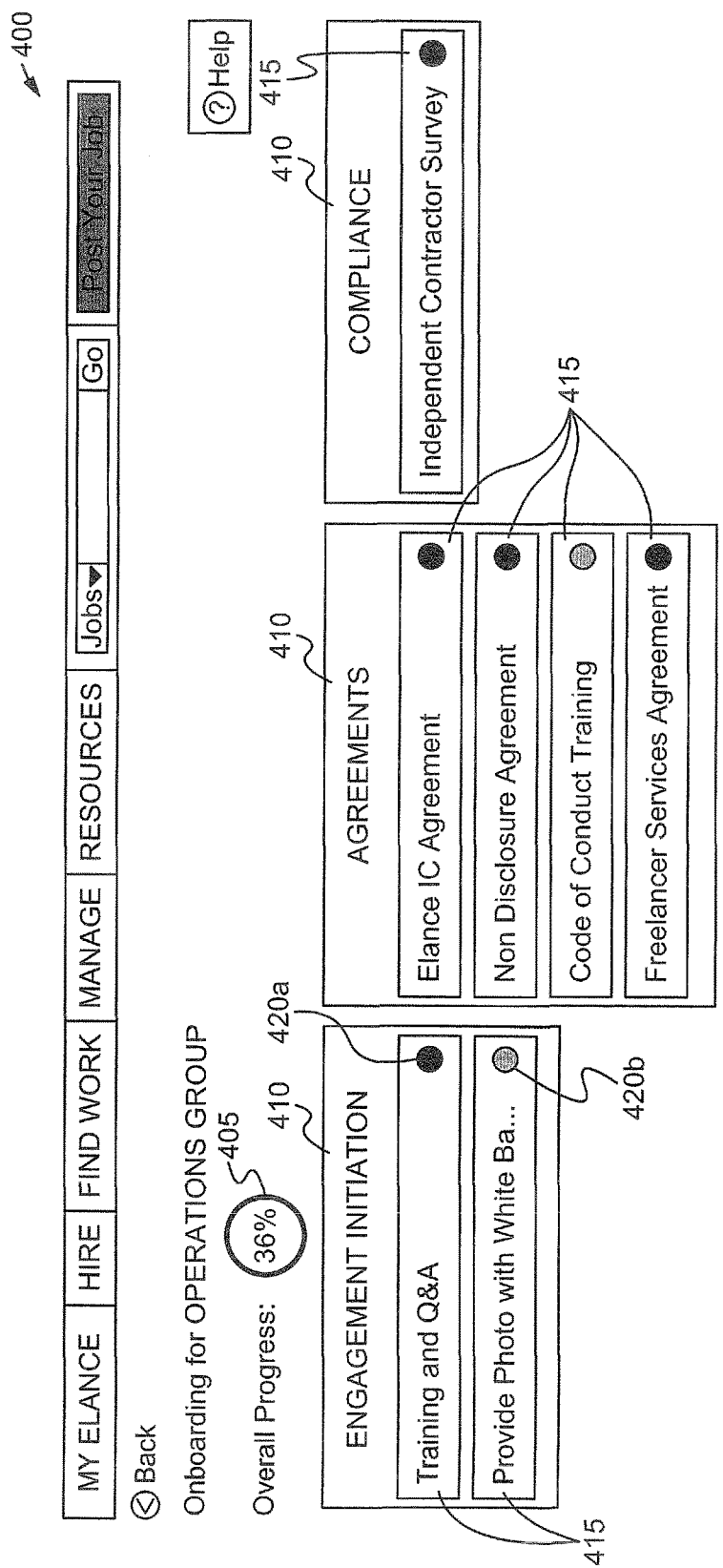
FIGS. 4A-4B illustrate an exemplary client view of an onboarding dashboard in accordance with some embodiments.
Figure 4B:
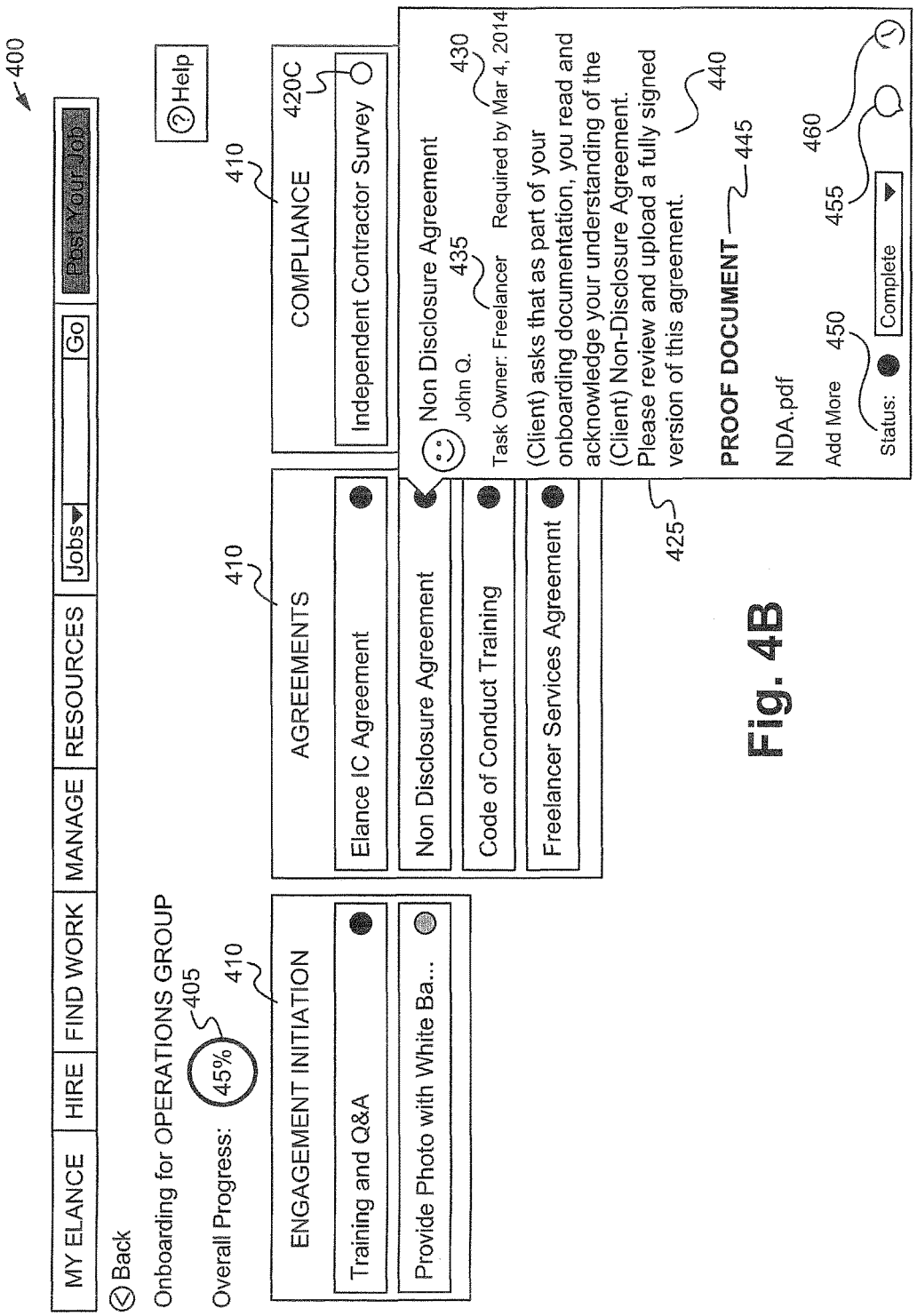

FIGS. 4A-4B illustrate an exemplary client view of an onboarding dashboard 400 in accordance with some embodiments. In FIGS. 4A-4B, the onboarding dashboard 400 is associated with the "Operations Group." The onboarding dashboard 400 will typically include an indicator 405 of the overall progress of the onboarding process. The onboarding tasks configured by the client are typically grouped into different onboarding sections and are reflected as such in the onboarding dashboard 400. Again, the specifics of the client configuring the onboarding tasks are discussed in FIG. 6.

In FIG. 4A, the onboarding sections 410 include an Engagement Initiation section, an Agreements section, and a Compliance section. However, other sections, such as a Pre-Screening section and a Documentation section, are possible and are shown in the onboarding dashboard 400 if the client has configured these other sections. The Engagement Initiation section includes a Training and Q&A task and a Provide Photo task. The Agreements section includes an Elance IC Agreement task, a Non-Disclosure Agreement task, a Code of Conduct Training task, and a Freelancer Services Agreement task. The Compliance section includes an Independent Contractor Survey task.

As explained elsewhere, each task is assigned an owner and can either be optional or required. An optional task does not need to be completed by the task owner, while a required task must be completed by the task owner. A task can be dependent on another task being completed. For example, the Code of Conduct Training task cannot be started unless the Elance IC Agreement task, the Non-Disclosure Agreement task and the Freelancer Services Agreement task are completed. In some embodiments, task dependencies can occur across multiple onboarding sections in addition to within a single onboarding section. For example, the Elance IC Agreement task cannot be started before the Training and Q&A task is completed. The tasks listed in each section may or may not be ordered in the sequence of requirements. In some embodiments, if a subsequent task is dependent on other task(s) that are not yet completed, then the freelancer is prevented from starting this subsequent task (e.g., downloading/uploading documents, viewing a video, etc., associated with the subsequent task) until the other task(s) are completed. In some embodiments, upon activation of the subsequent task, a popup window message is generated to inform the freelancer which other task(s) need to be completed prior to starting the subsequent task.

In some embodiments, tasks that have been completed, tasks that have not yet been started, tasks that have been started but not yet completed and flagged tasks are distinguished from each other in the onboarding dashboard 400. For example, completed tasks are shown in dark full circles 420a (FIG. 4A), tasks that have not yet been started are shown in light full circles 420b (FIG. 4A), and tasks that have been started but not yet completed are shown in dark ring 420c (FIG. 4B). For another example, flagged tasks are shown in different colors from those tasks that are not flagged. A task that is flagged requires attention by either the client, the freelancer or both. Other distinguishing marks in the onboarding dashboard 400 are possible. It should be noted that the onboarding dashboard is extensible and can include more or less statuses.

Referring to FIG. 4B, the freelancer is able to activate a task to view details of that task and/or to start that task. For example, upon activation of the Non-Disclosure Agreement task such as via a mouse-over or the like, a popup window 425 appears. In some embodiments, the popup window 425 includes whether the task is either optional or required 430. In some embodiment, a deadline to complete the task is also provided. In some embodiments, the popup window 425 includes a countdown timer 460 to the deadline. In some embodiments, the popup window 425 includes who is responsible for completion of the task 435, which can either the freelancer or the client (e.g., administrator, compliance manager, hiring manager, etc.). In some embodiments, the popup window 425 includes a description of that task 440 and an ability to download and/or upload file(s) 445. The description can include text, a multimedia video, a hyperlink to a destination, and/or other suitable content. In some embodiments, if the owner of the task is the client, then the description of that task 440 is not shown since the freelancer is not privy to such details as it is private information to the client. In some embodiments, the popup window 425 allows the task owner to update/change the status of the task 450 (e.g., completed, started but not yet completed, flagged, not yet started). In some embodiments, the status cannot be updated to "completed" unless at least one document is provided with the task or a required video is viewed, etc. In some embodiments, the popup window 425 includes a communication feature 455 that allows the client and the freelancer to communicate regarding the task. In some embodiments, all communication is through the services exchange medium. A history of events that pertains to the activity, which includes at least a communication thread and file upload/download activities, is stored in a data store and displayed in the popup window 425 each time the activity is activated from the onboarding dashboard 400. The history of events advantageously provides full visibility regarding the progress and/or completion of the task. In some embodiments, the freelancer is able to view any of the files associated with the activity from the popup window 425.

Figure 5A:
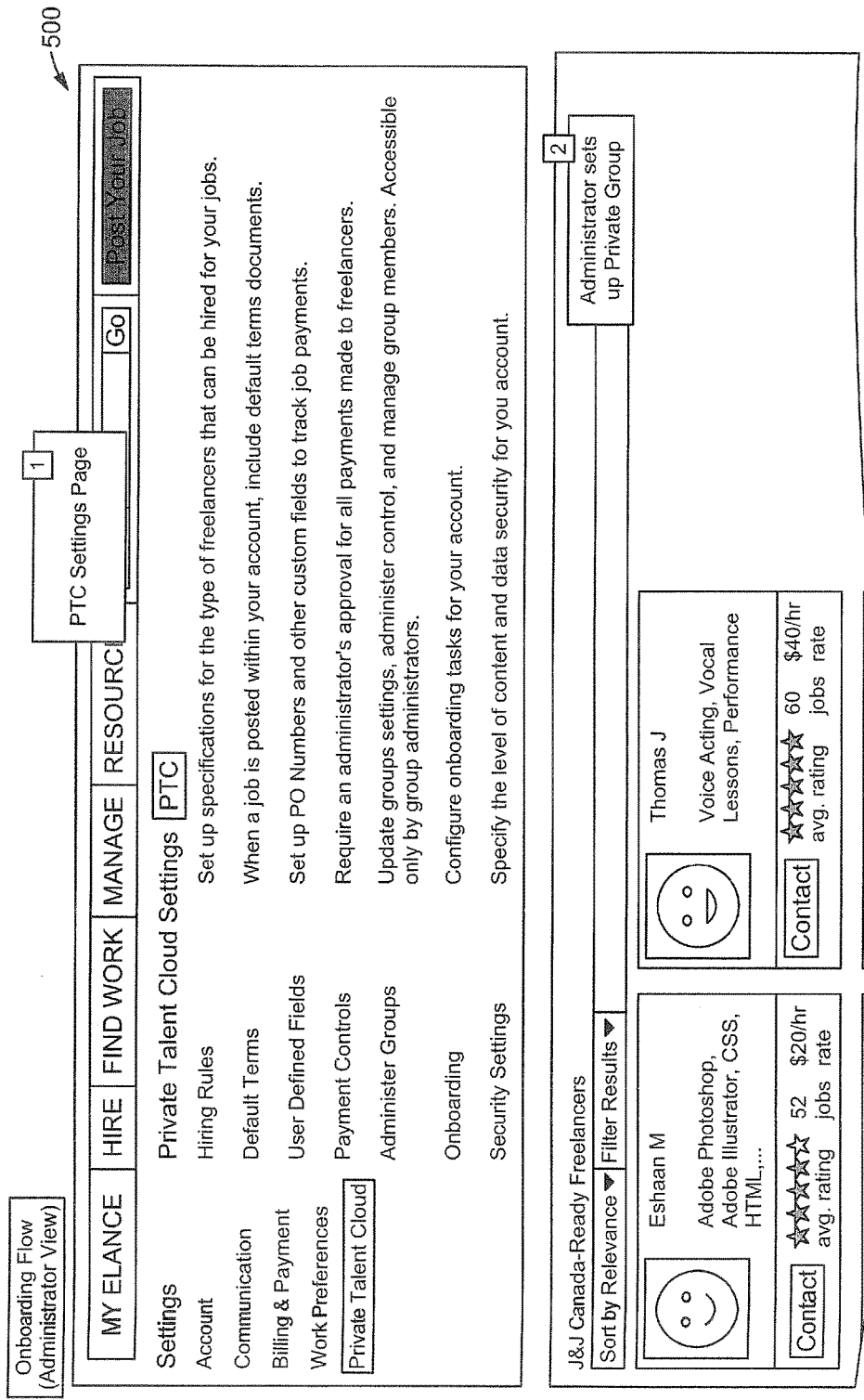
FIGS. 5A-5C illustrate a graphical flow of an onboarding process from a client perspective in accordance with some embodiments.
Figure 5B:
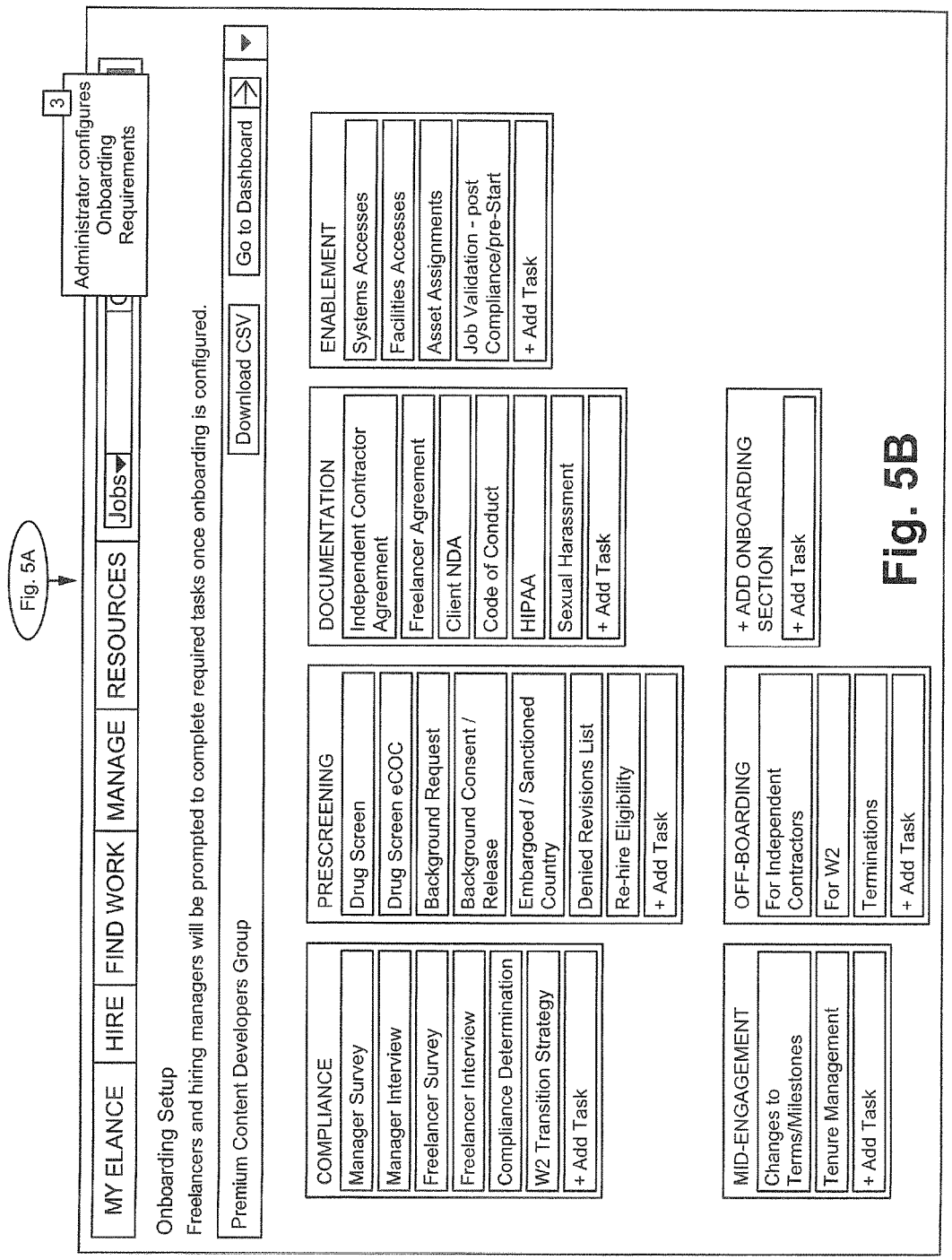
Figure 5C:
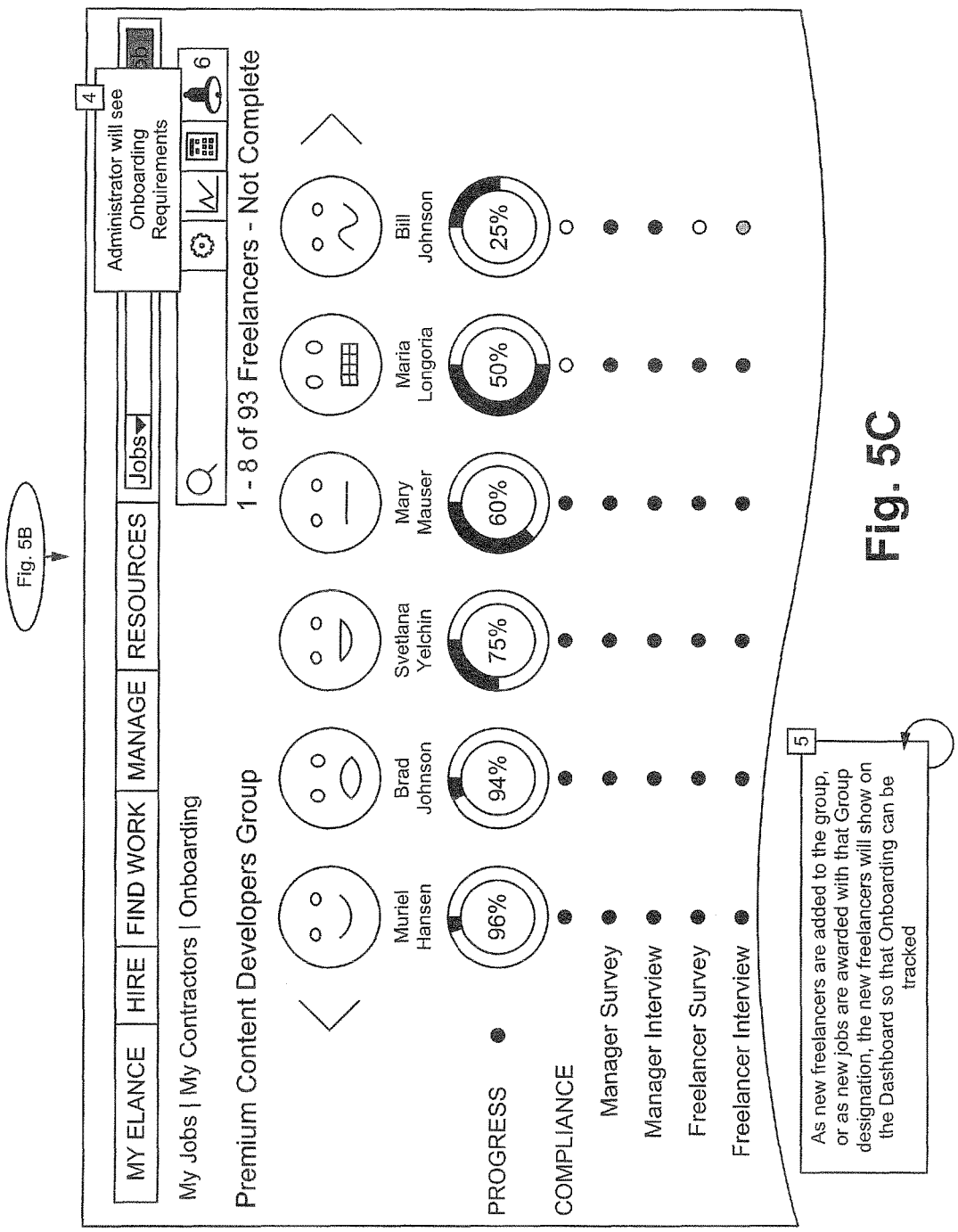
Figure 6:
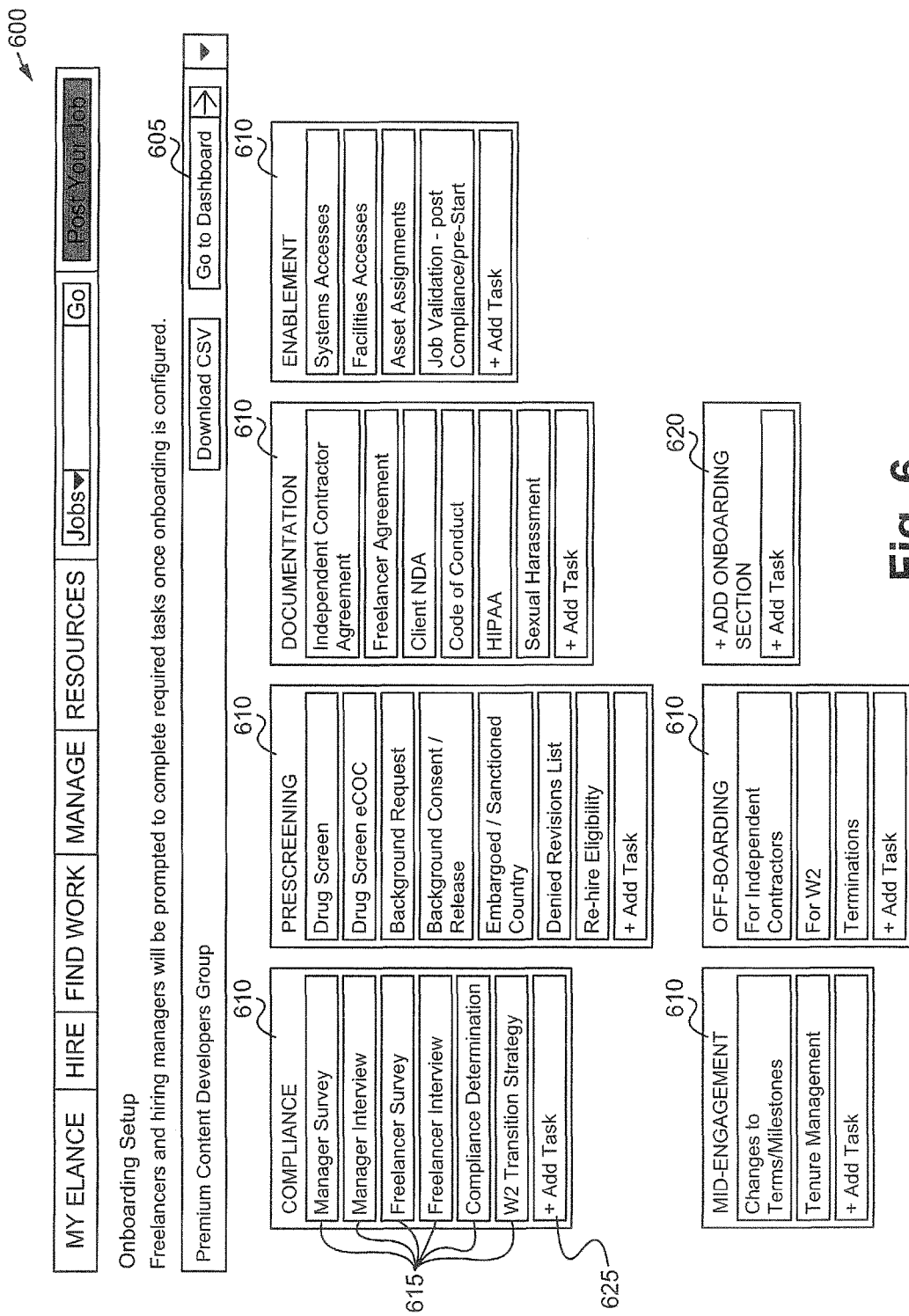
FIG. 6 illustrates a graphical representation of onboarding setup interface in accordance with some embodiments.
Figure 7:
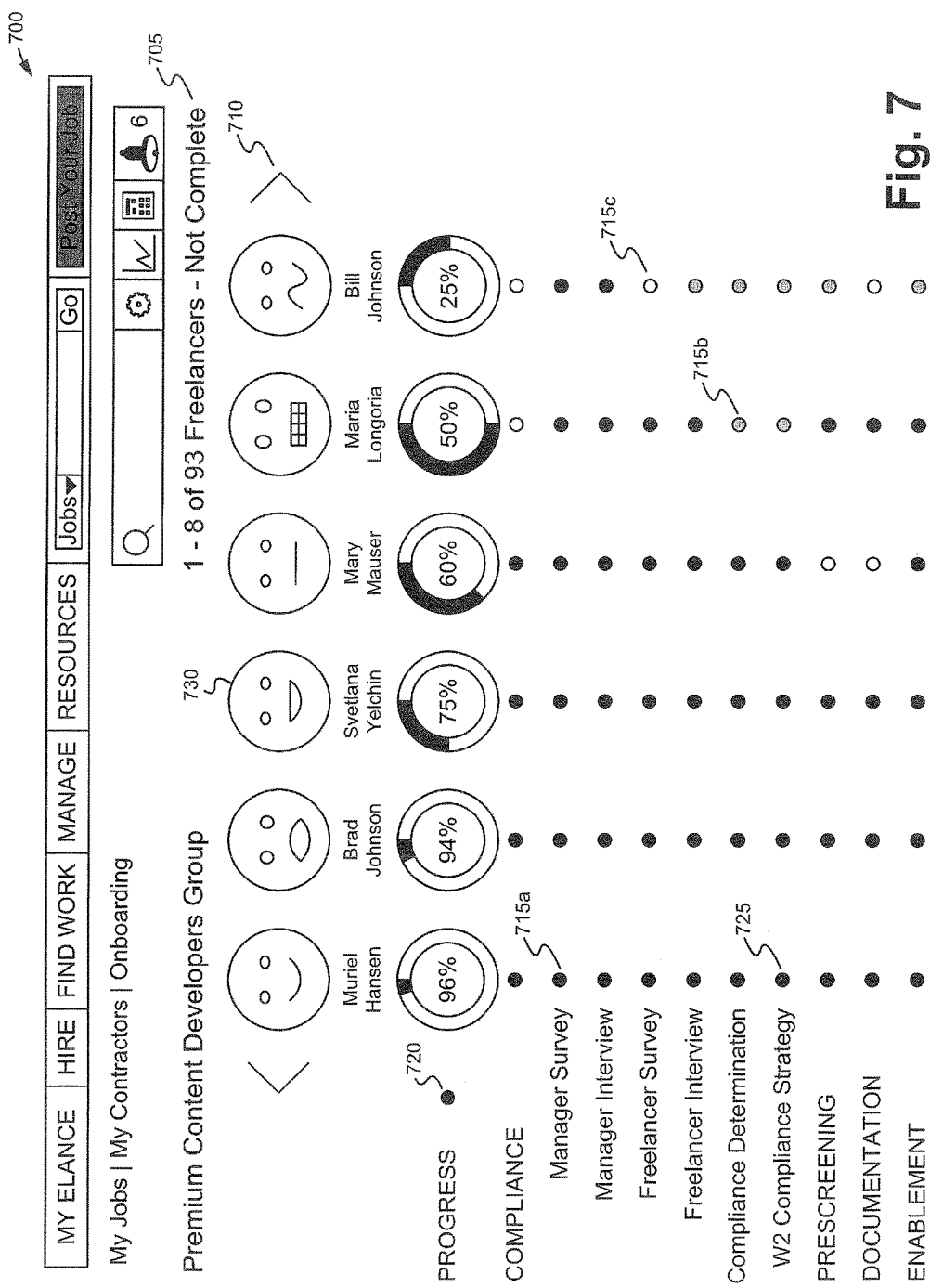
FIG. 7 illustrates an exemplary client view of an onboarding dashboard in accordance with some embodiments.

FIGS. 5A-5C illustrate a graphical flow 500 of an onboarding process from a client perspective in accordance with some embodiments. The graphical flow 500 includes an exemplary screenshot at each step of the onboarding process. The graphical flow 500 begins on FIG. 5A and continues on FIGS. 5B-5C. At Step 1, the client is able to activate certain links, including an Administer Groups link and an Onboarding link, from a setting user interface. Activation of the Administer Groups link allows the client to set up different groups in the services exchange medium, such as the "Operations Group" (FIGS. 4A-4B) and the "Premium Content Developers Group" (FIGS. 6-7). Activation of the Onboarding link allows the client to configure onboarding tasks for each of the groups the client has set up. At Step 2, the client (e.g., administrator) sets up different groups in the client's organization. The client is able to assign each freelancer that the client engages with to one of the groups, such as when the client invites them to join the services exchange medium. At Step 3, the client configures onboarding tasks for each group. Briefly, configurations for a task include indicating whether the task is required or optional, who the task owner (e.g., freelancer, administrator, compliance manager or hiring manager, etc.), and whether the task is dependent on another task (e.g., completed in sequence, after completion of the another task) or is independent from other tasks (e.g., completed in parallel with the other tasks). Specifics of the client configuring the onboarding tasks are further discussed in FIG. 6. At Step 4, the client is able to see progress of the onboarding process for each freelancer that the client is engaged with. Specifics of the client's view of the onboarding dashboard are further discussed in FIG. 7. The onboarding dashboard typically pertains to one of the groups that the client has previously set up at the Step 2. At Step 5, as new freelancers are added to the group or as new jobs are awarded with that group designation, the new freelancers will be reflected on the onboarding dashboard so that onboarding can be tracked.

FIG. 6 illustrates a graphical representation of onboarding setup interface 600 in accordance with some embodiments. In FIG. 6, the onboarding setup interface 600 is associated with the "Premium Content Developers Group." The onboarding setup interface 600 includes a link for the client to view the onboarding dashboard, which is illustrated in FIG. 7. In FIG. 6, six onboarding sections 610 are already created for the group: a Compliance section, a Pre-Screening section, a Documentation section, an Enablement section, a Mid-Engagement section, and an Offboarding section. Each section typically includes at least one task 615. For example, the Compliance section includes six tasks: a Manager Survey task, a Manager Interview task, a Freelancer Survey task, a Freelancer Interview survey task, a Compliance Determination task and a W2 Transition Strategy task. The client is able to add more tasks 615 to each section 610 via an add feature 625 associated with that section 610. In some embodiments, the client is able to remove a task by activating that task, which will take the client to a task configuration interface to configure the task. This task configuration interface allows the client to edit specifics of the task and to remove the task from the section. Other ways to remove a task are contemplated. Alternatively, the client is not able to remove a task once the task is added. The client is also able to add additional sections via an add feature 620. When a new section is added, the client is able to add tasks to that new section via the associated add feature. In some embodiments, if a section does not include at least one task, then that section is not reflected in corresponding onboarding dashboards for the client and the freelancer.

The task configuration interface for each task allows the client to include a description of the task, which can be text-based, multimedia-based and/or another suitable format. The client is also able to indicate whether the task is optional or required, and who the responsible party is for the completion of the task (e.g., task owner). In some embodiments, alerts regarding the task are sent to at least the task owner. The client is also able to indicate whether file attachments are required to close the task (e.g., indicated as completed). The client is also able to set up permissions regarding who can view the task and who can update the status of the task. The client is also able include internal notes regarding the task that are not made available to the freelancer. The client is also able to add tags to the task for reporting purposes. The client is also able to add task dependencies, which indicate which other task(s) need to be completed before this task can be started. The client is also able to include alerts and tracking of whether the deadline to complete the task has passed. The client is also able to set reoccurring reminders at different time intervals (e.g., monthly, yearly, etc.) if the task, such as a drug test, needs to be repeated in the future. The client is also able to set future tasks to be completed along with proper alerts to the responsible party(ies). Other configurations are contemplated. After the client is finished configuring the task, the information is saved and retrievable for later modifications.

It should be noted that each group can have different onboarding tasks. For example, freelancers in the logo design group do not need a background check, while freelancers who work with confidential information do need a background check. Typically, the client indicates which group the freelancer that the client is engaging with belongs to, such as during the invitation to join the services exchange medium (FIG. 3, Step 1). In some embodiments, the configurations for one group can be used as a basis for configuring another group that the client additionally creates such that the client need not repeat the same configurations for multiple groups, thereby saving time and resources.

Referring again to FIG. 6, the onboarding setup interface 600 allows the client to rearrange the sections 610 and to rearrange the tasks 615 within each section 610 and across sections 610 via, for example, drag and drop actions. For example, the Enablement section can be moved to after the Pre-screening section and before the Documentation section by a drag and drop action. Rearrangements can be done for presentation purposes. Once the client is done with the onboarding setup for the group, the client is able to view the onboarding dashboard to see the onboarding progress of each freelancer associated with the group.

FIG. 7 illustrates an exemplary client view of an onboarding dashboard 700 in accordance with some embodiments. Continuing with the above example, the onboarding dashboard 700 shows freelancers in the "Premium Content Developers Group." FIG. 7 shows those freelancers associated with this group who have not yet completed the onboarding process. However, the client is able to toggle between this view, a view of all those who have completed the onboarding process, and a view of all of the freelancers associated with this group via a toggle element 705. The onboarding dashboard 700 displays up to eight freelancers at a time, although that number is only exemplary and do not limit the invention in any way. The client is able to scroll between different pages of freelancers via a scroll feature 710. Progress of the onboarding process for each freelancer is shown beneath an area for their image 730. In some embodiments, the freelancers are ordered by their progress. However, other orderings or sorts are contemplated.

The onboarding dashboard 700 organizes the freelancers, their overall progress and the status of each task in a table. In FIG. 7, the tasks are shown in the first column, and each of the freelancers is shown in a subsequent column. The tasks are organized by sections. When a section is activated, the table expands to list the associated tasks for that section. In FIG. 7, the tasks associated with the Compliance section are listed, but the tasks for the Pre-Screening section, the Documentation section and the Enablement section are not listed.

In some embodiments, tasks that have been completed, tasks that have not yet been started, tasks flagged and tasks that have been started but not yet completed are distinguished from each other. For example, completed tasks are shown in dark full circles 715*a*, tasks that have not yet been started are shown in light full circles 715*b*, and tasks that have been started but not yet completed are shown in dark ring 715*c*. For another example, flagged tasks are shown in a different color (e.g., red) than those tasks that are not flagged (e.g., green). In some embodiments, if the deadline to complete a task has passed, then the status is automatically designated in yellow or some other differentiating color. Although other distinguishing marks in the onboarding dashboard 700 are possible, in one embodiment, the distinguishing marks in the onboarding dashboard 700 are consistent with the distinguishing marks in the onboarding dashboard 400. It should be noted that the onboarding dashboard is extensible and can include more or less statuses. An aspect of the present invention is to allow the client to track freelancers in different statuses.

The onboarding dashboard 700 allows the client to filter the view based on a selected status of a particular section or a particular task via a progress detail feature 720. In some embodiments, upon activation of the progress detail feature 720, a filter is associated with each task or section that allows the client to filter freelancers for that task or section based on the selected status. For example, using the filter for the Compliance section, the client is able to choose to see those freelancers who have completed the Compliance section, to see those freelancers who have started but not yet completed the Compliance section, to see those freelancers who have one or more flagged tasks associated with the Compliance section, to see those freelancers who have not yet started the Compliance section, or to see those freelancers who have missed a deadline for at least one task associated with the Compliance section. The progress detail feature 720 allows the client to narrow down and track freelancers being delayed in the onboarding process so that the client is able to work with these freelancers to get the onboarding tasks completed.

In some embodiments, the client is able to access information of a freelancer by activating the freelancer's image 730 from the onboarding dashboard 700. The information includes a link to the freelancer's online profile and a description of the job that the freelancer is associated with. The information can also include a link to a communications infrastructure within the services exchange medium that allows the client to communicate with the freelancer in realtime via the services exchange medium. Exemplary realtime communications include Internet phone calls and instant chat/messaging.

In some embodiments, the client is able is able to activate a task to view details of that task from the onboarding dashboard 700. For example, upon activation of the W2 Compliance Strategy task 725 under freelancer Muriel Hansen, such as via a mouse-over or the like, a popup window (not illustrated) appears. In some embodiments, the popup window is similar to the popup window 425 of FIG. 4B. In some embodiments, a history of events that pertains to the activity, which includes at least a communication thread and file upload/download activities, is displayed in the popup window each time the activity is activated from the onboarding dashboard 700. The history of events provides full visibility regarding the progress and/or completion of the task. In some embodiments, the client is able to view any of the files associated with the activity from the popup window.

Figure 8:
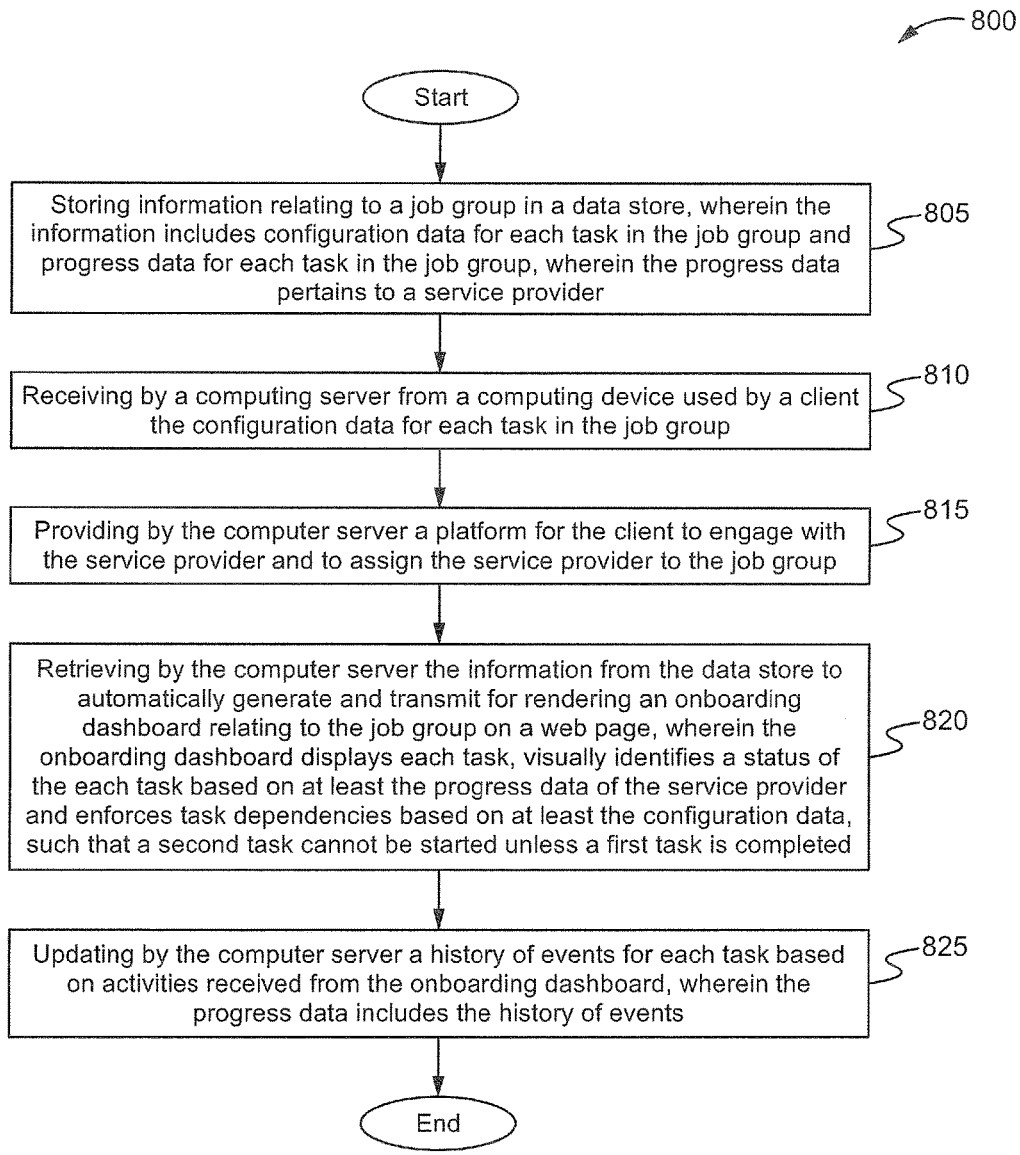
FIG. 8 illustrates an exemplary method of implementing an onboarding dashboard in accordance with some embodiments.

In some embodiments, the onboarding dashboard is implemented by a system that includes a data store and a computer server at a services exchange medium. The computer server is typically communicatively coupled with the data store. FIG. 8 illustrates an exemplary method 800 of implementing an onboarding dashboard in accordance with some embodiments. At Step 805, information relating to a job group is stored in the data store. The information typically includes configuration data for each task in the job group and progress data for each task in the job group. In some embodiments, the configuration data for the each task indicates an owner of the each task. For example, the owner can be the client or the service provider. In some embodiments, the configuration data for the each task also indicates that the completion of the each task is required or is optional. In some embodiments, the configuration data for the each task also indicates that the each task is dependent on another task or is independent of other tasks. In some embodiments, the configuration data also includes a schedule of future tasks to be completed and/or a schedule of reoccurring tasks to be completed, wherein the schedules are configured by the client. The progress data typically pertains to a service provider.

At Step 810, the computing server receives from a computing device used by a client the configuration data for each task in the job group.

At Step 815, the computer server provides a platform for the client to engage with the service provider and to assign the service provider to the job group. In some embodiments, the platform is a web-based platform that includes a search feature and a hire feature to search for and hire the service provider.

At Step 820, the computer server retrieves the information from the data store to automatically generate and transmit for rendering the onboarding dashboard relating to the job group on a web page. The onboarding dashboard typically displays each task, visually identifies a status of the each task based on at least the progress data of the service provider and enforces task dependencies based on at least the configuration data such that a second task cannot be started unless a first task is completed. The status of the each task can be either completed, started but not yet completed, not yet started, flagged or past due. In some embodiments, the configuration data for the each task indicates that a specified user activity, such as uploading a document, viewing a video, or the like, must be performed in order for the status to be changed.

At Step 825, the computer server updates a history of events for each task based on activities received from the onboarding dashboard. The progress data typically includes the history of events.

In some embodiments, the computer server is programmed to receive a signal activating one of the tasks displayed in the onboarding dashboard. In some embodiments, the computer server is programmed to, in response to the signal, automatically generate and transmit a window displaying the history of events pertaining to the activated task. In some embodiments, the computer server is programmed to, in response to the signal, prevent the start of the activated task when one or more tasks that the activated task depends on are not yet completed.

Figure 9:
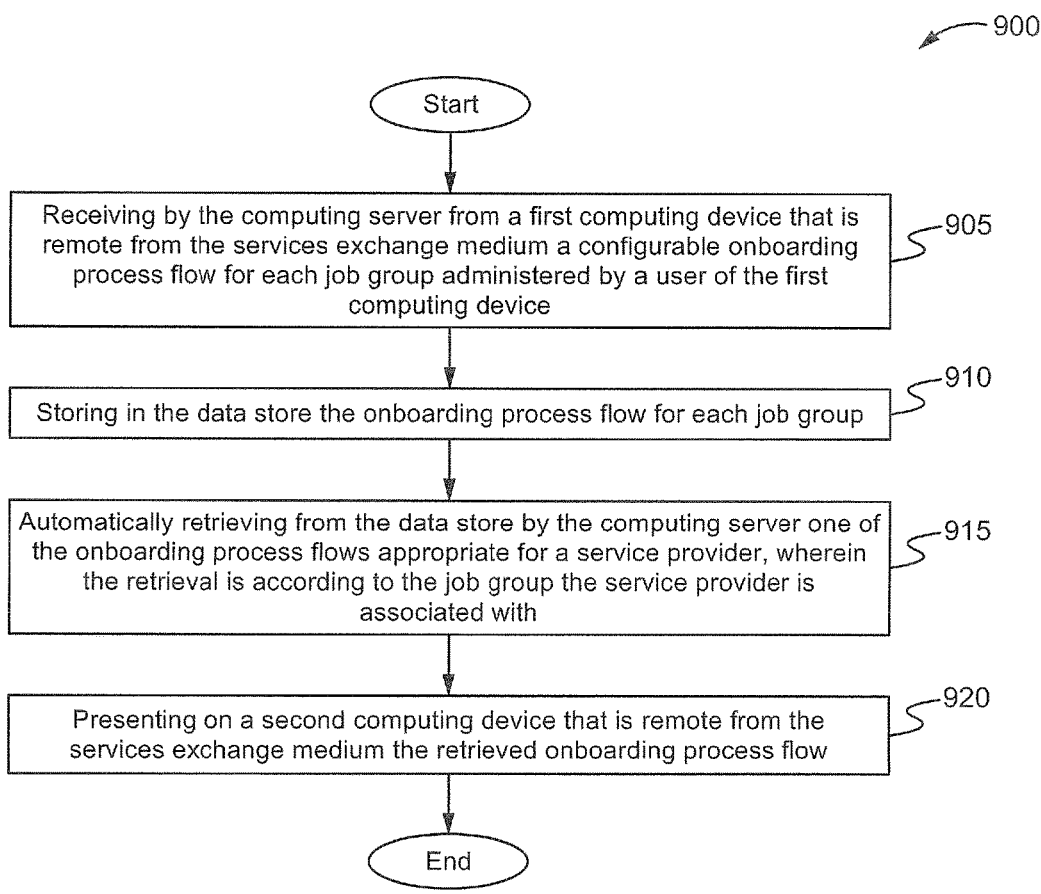
FIG. 9 illustrates another exemplary method of implementing an onboarding dashboard in accordance with some embodiments.

FIG. 9 illustrates another exemplary method 900 of implementing an onboarding dashboard in accordance with some embodiments. At Step 905, the computing server receives from a first computing device that is remote from the services exchange medium a configurable onboarding process flow for each job group administered by a user of the first computing device.

At Step 910, the onboarding process flow for each job group is stored in the data store.

At Step 915, the computing server automatically retrieves from the data store one of the onboarding process flows appropriate for a service provider. The retrieval is typically according to the job group the service provider is associated with. In some embodiments, the retrieved onboarding process includes steps and rules. In some embodiments, one of the rules indicates that one of the steps can be completed in parallel with other steps in the retrieved onboarding process flow. In some embodiments, one of the rules indicates that one of the steps can only be started after other steps in the retrieved onboarding process flow are completed. In some embodiments, the rules enforce step dependencies.

At Step 920, the retrieved onboarding process flow is presented on a second computing device that is remote from the services exchange medium. In some embodiments, the second computing device is used by the service provider. In some embodiments, the retrieved onboarding process flow is rendered in the onboarding dashboard. In some embodiments, the onboarding dashboard visually identifies a status of each step and is a single access point for retrieving all contents associated with the retrieved onboarding process. The contents can include all file histories for all the tasks associated with the retrieved onboarding process.

In some embodiments, onboarding processes can be more rigorous or less. In some embodiments, once a freelancer is offered a job by a client, the services exchange medium reviews data about the job (e.g., duration, work arrangement, etc.), the client and/or the freelancer (e.g., location, how actively they have been engaged with other clients, etc.), and performs a worker classification evaluation based on the data. Depending on the outcome of the evaluation, the freelancer will be asked to perform a more or less rigorous onboarding process. In particular, in some embodiments, the onboarding dashboard framework allows the client to configure different levels of a single task when the client is configuring the onboarding tasks, such as via the task configuration interface. The freelancer is asked to perform/complete the suitable level of the task according to the outcome of the evaluation.

As discussed above, the prior art onboarding process is error prone because it is manual and involves lots of paper, which can result in the loss of documentation and in the delay of handoffs. It can therefore be a challenge and frustrating to manage and oversee the prior art onboarding process. As discussed herein, unlike the prior art onboarding process, embodiments of the onboarding dashboard of the present invention provides instant kickoff to the onboarding process, provides clear steps, control, visibility and pinpoints delays in the onboarding process, and streamlines the collection of documents. The onboarding dashboard provides a pleasant experience yet a faster way through the onboarding process as compared to the traditional manual onboarding process. The automation of the onboarding process advantageously cuts down risks, delays and confusion for both the client and candidates, allowing the candidates to transition into welcomed and engaged service providers as they work for clients.

As shown in FIG. 6, the onboarding dashboard 600 also provides for not only the onboarding stage, but also the mid-engagement stage and the offboarding stage. Offboarding is as important as onboarding in a life cycle of an worker. The offboarding process helps to prepare a service provider for departure by assisting with the completion of important tasks, such as performing exit interviews, finalizing paperwork and returning of company property. Accordingly, the adherence process from the beginning to the end of the worker life cycle is advantageously tracked with full visibility and control over the process.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for streamlining online work process, the system comprising:
　a data store storing information relating to different job groups, wherein the information includes configuration data and progress data for each task in each of the job groups; and
　a computer server at a services exchange medium and communicatively coupled with the data store, wherein the computer server is programmed to:
　　receive, via a first user interface on a first remote computing device used by a client:
　　　instructions to create a plurality of onboarding dashboards, wherein each of the plurality of onboarding dashboards is associated with one of the job groups, wherein each of the plurality of onboarding dashboards presents all tasks for a respective job group in a presentation that is customizable; and
　　　the configuration data for each task in each of the job groups;
　　provide a platform, wherein the platform receives a posting for a job submitted by the client, intelligently suggests to the client one of a plurality service providers in the services exchange medium in response to the posting and allows the client to select one of the job groups that is related to the posting to thereby assign the service provider to the selected job group;
　　automatically transition from the assignment to an onboarding process by retrieving the information from the data store to generate and transmit for rendering the onboarding dashboard relating to the selected job group in a second interface on a second remote computing device used by the service provider, wherein the onboarding dashboard displays each of the tasks in accordance with the presentation, visually identifies a status of the each of the tasks based on at least the progress data of the service provider and enforces task dependencies based on at least the configuration data, such that a second task cannot be started unless the status of a first task is completed;
　　generate a task summary for a respective task that can be reached directly from the onboarding dashboard, wherein the task summary is configured as a single access point to full visibility into activities of the respective task by displaying a list of contents for only the respective task, wherein each of the contents in the list being selectable to launch a respective document to be seen without fully obscuring the onboarding dashboard;
　　update the history of events for each of the tasks for the job group based on activities received from the onboarding dashboard, wherein the progress data includes the history of events; and
　　upon completion of at least a required portion of the onboarding process, provide the platform to capture progress of online completion of deliverables for the job being performed by the service provider within the services exchange medium.

2. The system of claim 1, wherein the status is one of completed, started but not yet completed, not yet started, flagged, and past due.

3. The system of claim 2, wherein the configuration data for the each task indicates that a specified user activity must be performed in order for the status to be changed to completed.

4. The system of claim 3, wherein the specified user activity is uploading a document.

5. The system of claim 3, wherein the specified user activity is viewing a video.

6. The system of claim 2, wherein the configuration data for the each task indicates an owner of the each task.

7. The system of claim 6, wherein the owner is the client.

8. The system of claim 6, wherein the owner is the service provider.

9. The system of claim 2, wherein the configuration data for the each task indicates that the completion of the each task is required or is optional.

10. The system of claim 2, wherein the configuration data for the each task indicates that the each task is dependent on another task or is independent from other tasks.

11. The system of claim 10, wherein the computer server is programmed to receive a signal activating one of the tasks displayed in the onboarding dashboard.

12. The system of claim 11, wherein the computer server is programmed to, in response to the signal, automatically generate and transmit a window displaying the task summary.

13. The system of claim 11, wherein the computing server is programmed to, in response to the signal, prevent the start of the activated task when one or more tasks that the activated task depends on are not yet completed.

14. A method of streamlining online work process, the method comprising:
   storing by a computer server information relating to different job groups in a data store, wherein the information includes configuration data and progress data for each task in each of the job groups;
   receiving by the computer server from a computing device used by a client:
      instructions to create a plurality of onboarding dashboards, wherein each of the plurality of onboarding dashboards is associated with one of the job groups, wherein each of the plurality of onboarding dashboards presents all tasks for a respective job group in a presentation that is customizable via drag and drop actions; and
      the configuration data for each task in each of the job groups;
   providing by the computer server a platform that receives a posting for a job submitted by the client, intelligently suggests to the client one of a plurality service providers in a services exchange medium in response to a posting and allows the client to select one of the job groups that is related to the posting to thereby assign the service provider to the selected job group;
   upon assignment, initiating an onboarding process by retrieving by the computer server the information from the data store to generate and transmit for rendering the onboarding dashboard relating to the selected job group in display of a second remote computing device used by the service provider, wherein the onboarding dashboard displays each of the tasks in accordance with the presentation, visually identifies a status of the each of the tasks based on at least the progress data of the service provider and enforces task dependencies based on at least the configuration data, such that a second task cannot be started unless the status of a first task is completed;
   generating by the computer server a task summary for a respective task that can be reached directly from the onboarding dashboard, wherein the task summary is configured as a single access point to full visibility into activities of the respective task by displaying a list of contents for only the respective task, wherein each of the contents in the list being selectable to launch a respective document to be seen without fully obscuring the onboarding dashboard;
   updating by the computer server the history of events for each of the tasks for the job group based on activities received from the onboarding dashboard, wherein the progress data includes the history of events; and
   upon completion of at least a required portion of the onboarding process, enabling by the computer server the platform to capture progress of online completion of deliverables for the job being performed by the service provider within the services exchange medium.

15. The method of claim 14, wherein the configuration data includes a schedule of future tasks to be completed after the start of the online work and a schedule of reoccurring tasks to be completed after the start of the online work, wherein the schedules are configured by the client.

16. A method of streamlining online work process in a services exchange medium, wherein the services exchange medium includes a computing server and a data store in communication with the computing server, the method comprising:
   receiving by the computing server from a first computing device that is remote from the services exchange medium a configurable onboarding process flow for each job group administered by a user of the first computing device;
   storing in the data store the onboarding process flow for each job group;
   providing a platform that receives a posting for a job submitted by the user, intelligently suggests to the user a service provider, wherein the platform allows the user to select an appropriate job group that is related to the posting and to assign the service provider to the appropriate job group;
   automatically transitioning from the assignment to an onboarding process by retrieving from the data store by the computing server one of the onboarding process flows, wherein the retrieval is according to the job group the service provider is assigned to;
   presenting on a second computing device that is remote from the services exchange medium the retrieved onboarding process flow;
   generating a task summary for a respective task that can be reached directly from a user interface for the onboarding process flow, wherein the task summary is configured as a single access point to full visibility into activities of the respective task by displaying a list of contents for only the respective task, wherein each of the contents in the list being selectable to launch a respective document to be seen without fully obscuring the user interface; and
   upon completion of at least a portion of the onboarding process flow, providing the platform to capture progress of online completion of deliverables for the job being performed on the second computing device.

17. The method of claim 16, wherein the retrieved onboarding process includes steps and rules.

18. The method of claim 17, wherein one of the rules indicates that one of the steps can be completed in parallel with other steps in the retrieved onboarding process flow.

19. The method of claim 17, wherein one of the rules indicates that one of the steps can only be started after other steps in the retrieved onboarding process flow are completed.

20. The method of claim 17, wherein the rules enforce step dependencies.

21. The method of claim 16, wherein the retrieved onboarding process flow is rendered in an onboarding dashboard, wherein the onboarding dashboard visually identifies a status of each step and is a single access point for retrieving all contents associated with the retrieved onboarding process flow.

\* \* \* \* \*